US012694844B2

(12) United States Patent
Wu et al.

(10) Patent No.: US 12,694,844 B2
(45) Date of Patent: Jul. 28, 2026

(54) DISPLAY PANEL AND DISPLAY APPARATUS

(71) Applicant: HKC CORPORATION LIMITED, Shenzhen (CN)

(72) Inventors: Zhuotong Wu, Shenzhen (CN); Wenxin Li, Shenzhen (CN); Junfeng Xie, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 18/999,644

(22) Filed: Dec. 23, 2024

(65) Prior Publication Data

US 2025/0225945 A1 Jul. 10, 2025

(30) Foreign Application Priority Data

Jan. 5, 2024 (CN) ......................... 202410015658.3

(51) Int. Cl.
*G09G 3/36* (2006.01)

(52) U.S. Cl.
CPC ......... *G09G 3/3607* (2013.01); *G09G 3/3614* (2013.01); *G09G 3/3648* (2013.01); *G09G 2310/08* (2013.01); *G09G 2320/0233* (2013.01)

(58) Field of Classification Search
CPC ....... G09G 2320/0233; G09G 2310/08; G09G 3/3677; G09G 3/20
See application file for complete search history.

(56) References Cited

U.S. PATENT DOCUMENTS

| | | | | |
|---|---|---|---|---|
| 2021/0225272 | A1* | 7/2021 | Yang | G09G 3/2092 |
| 2021/0366428 | A1* | 11/2021 | He | G09G 3/3688 |
| 2024/0276109 | A1* | 8/2024 | Park | H04N 25/47 |

FOREIGN PATENT DOCUMENTS

| | | | |
|---|---|---|---|
| CN | 102568398 | A | 7/2012 |
| CN | 106205536 | A | 12/2016 |
| CN | 107665686 | A | 2/2018 |
| CN | 109509455 | A | 3/2019 |
| CN | 109545161 | A | 3/2019 |
| CN | 109584827 | A | 4/2019 |
| CN | 109658892 | A | 4/2019 |

OTHER PUBLICATIONS

The first office action issued in corresponding CN application No. 202410015658.3 dated Feb. 8, 2024.

* cited by examiner

*Primary Examiner* — Van N Chow

(74) *Attorney, Agent, or Firm* — HAUPTMAN HAM, LLP

(57) ABSTRACT

A display panel and a display apparatus are provided. The display panel includes multiple data lines, multiple scan lines, and multiple sub-pixels. The multiple sub-pixels include a first sub-pixel and a second sub-pixel, and the first sub-pixel and the second sub-pixel are adjacent to each other in a same row and are connected to a same data line. During display of one frame of image, the first sub-pixel receives a first data signal, and the second sub-pixel receives a second data signal. The polarity of the first data signal is opposite to the polarity of the second data signal. A display grayscale of the first sub-pixel after adjustment is less than or equal to a grayscale corresponding to the first data signal, and a difference between a display grayscale of the second sub-pixel after adjustment and a grayscale corresponding to the second data signal falls within a preset range.

8 Claims, 5 Drawing Sheets

| | GRAYSCALE OF FIRST SUB-PIXEL | 0 | 32 | 64 | 96 | 128 | 160 | 192 | 224 | 255 |
|---|---|---|---|---|---|---|---|---|---|---|
| GRAYSCALE OF FIRST SUB-PIXEL | T2/T2 | | | | | | | | | |
| 0 | | 1 | 1 | 1 | 1.1 | 1.1 | 1.15 | 1.15 | 1.2 | 1.2 |
| 32 | | 1 | 1 | 1 | 1.1 | 1.15 | 1.15 | 1.2 | 1.2 | 1.25 |
| 64 | | 1 | 1.1 | 1.1 | 1.15 | 1.15 | 1.2 | 1.2 | 1.25 | 1.25 |
| 96 | | 1.1 | 1.1 | 1.15 | 1.15 | 1.2 | 1.2 | 1.25 | 1.25 | 1.25 |
| 128 | | 1.1 | 1.15 | 1.15 | 1.2 | 1.2 | 1.25 | 1.25 | 1.25 | 1.3 |
| 160 | | 1.15 | 1.15 | 1.2 | 1.2 | 1.25 | 1.25 | 1.25 | 1.3 | 1.3 |
| 192 | | 1.15 | 1.2 | 1.2 | 1.25 | 1.25 | 1.25 | 1.3 | 1.3 | 1.3 |
| 224 | | 1.2 | 1.2 | 1.25 | 1.25 | 1.25 | 1.3 | 1.3 | 1.3 | 1.3 |
| 255 | | 1.2 | 1.25 | 1.25 | 1.25 | 1.3 | 1.3 | 1.3 | 1.3 | 1.3 |

| AVERAGE GRAYSCALE OF ONE ROW OF SUB-PIXELS | 0 | 32 | 64 | 96 | 128 | 160 | 192 | 224 | 255 |
|---|---|---|---|---|---|---|---|---|---|
| CHANGE OF COMMON VOLTAGE AT THE $\alpha$-th ROW (V) | 0 | 0 | 0.3 | 0.5 | 0.7 | 1 | 1.1 | 1.3 | 1.5 |
| CHANGE OF COMMON VOLTAGE AT THE ($\alpha$+1)-th ROW (V) | 0 | 0 | -0.3 | -0.5 | -0.7 | -1 | -1.1 | -1.3 | -1.5 |

FIG. 8

DISPLAY PANEL AND DISPLAY APPARATUS

CROSS-REFERENCE TO RELATED APPLICATION(S)

This application claims priority under 35 U.S.C. § 119(a) to Chinese Patent Application No. 202410015658.3, filed Jan. 5, 2024, the entire disclosure of which is incorporated herein by reference.

TECHNICAL FIELD

The present disclosure relates to the field of display technology, in particular, to a display panel and a display apparatus.

BACKGROUND

In a liquid crystal display (LCD) panel, by applying voltage to both ends of a liquid crystal molecule, the liquid crystal molecule is driven to rotate, thereby allowing the liquid crystal molecule to adjust the brightness of the light emitted by the pixel. Currently, to reduce costs, a dual-gate architecture, i.e., a dual-gate pixel architecture is usually adopted, where the number of data lines is reduced and the number of scan lines is increased.

However, in the dual-gate architecture, odd-column pixels and even-column pixels in the same row and connected to the same data line receive data signals with opposite polarities. Due to the parasitic capacitance on the data line, the even-column pixels are not fully charged, resulting in low brightness of the even-column pixels and vertical bright and dark lines on the screen. Therefore, how to balance the brightness of adjacent sub-pixels and eliminate vertical bright and dark lines on the screen is a problem to be solved.

SUMMARY

The disclosure provides a display panel, including m data lines extending in a first direction and sequentially arranged in a second direction, n scan lines extending in the second direction and sequentially arranged in the first direction, and multiple sub-pixels arranged in an array, where m and n are integers greater than or equal to 1, and the first direction is different from the second direction. The multiple sub-pixels include a first sub-pixel and a second sub-pixel, the first sub-pixel and the second sub-pixel are adjacent to each other in a same row and are connected to a same data line, the first sub-pixel is connected to a first scan line in two adjacent scan lines, and the second sub-pixel is connected to a second scan line in the two adjacent scan lines. During display of one frame of image, when the first sub-pixel receives a scanning signal from the first scan line within a scanning period, the first sub-pixel receives a first data signal; when the second sub-pixel receives the scanning signal from the second scan line within a scanning period, the second sub-pixel receives a second data signal, and a polarity of the first data signal is opposite to a polarity of the second data signal. A display grayscale of the first sub-pixel after adjustment is less than or equal to a grayscale corresponding to the first data signal, and a difference between a display grayscale of the second sub-pixel after adjustment and a grayscale corresponding to the second data signal falls within a preset range.

The disclosure further provides a display apparatus, including a power supply module and the display panel. The power supply module is configured to provide a power supply voltage for image display of the display panel.

BRIEF DESCRIPTION OF THE DRAWINGS

In order to describe technical solutions in the related art or embodiments of the disclosure more clearly, the following will give a brief introduction to the accompanying drawings required for describing the related art or embodiments. Apparently, the accompanying drawings hereinafter described are merely some embodiments of the disclosure. Based on these drawings, those of ordinary skill in the art can also obtain other drawings without creative effort.

FIG. 8 is a common voltage adjustment lookup table of FIG. 7.

Figure 1:
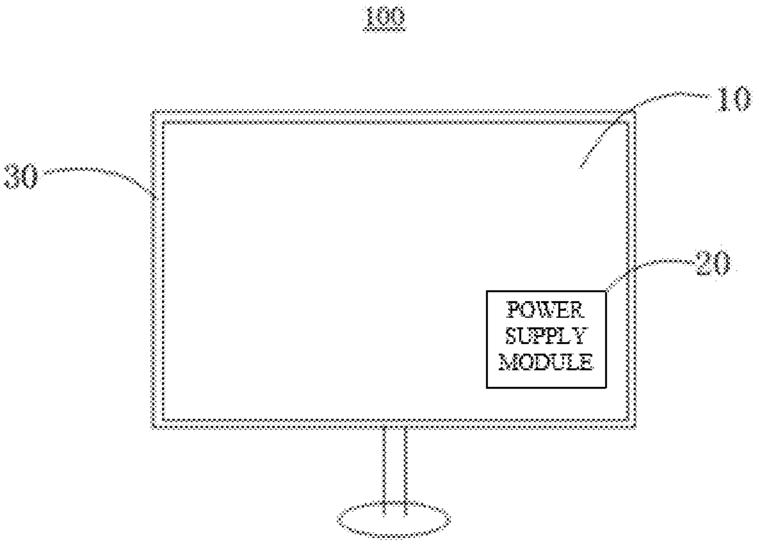
FIG. 1 is a schematic structural view of a display apparatus provided in the disclosure.

Reference signs: display apparatus—100, display panel—10, power supply module—20, support frame—30, backlight module—17, array substrate—10*c*, display medium layer—10*e*, opposite substrate—10*d*, first direction—F1, second direction—F2, m data lines—$D_1$~$D_m$, n scan lines—$S_1$~$S_n$, first color sub—pixel—P1, second color sub—pixel—P2, third color sub—pixel—P3, first sub—pixel—A, second sub—pixel—B, data control signal—TP, scan control signal—OE, clock signal—CLK, first moment—t1, second moment—t2, third moment—t3, fourth moment—t4, first duration—T1, second duration—T2, reference duration—T0, common voltage—$V_{com}$, reference voltage—V0.

DETAILED DESCRIPTION

In order to facilitate understanding of the present disclosure, a detailed description will now be given with reference to relevant accompanying drawings. The accompanying drawings illustrate some examples of embodiments of the present disclosure. However, the present disclosure can be implemented in many different forms and is not limited to the embodiments described herein. On the contrary, these embodiments are provided for a more thorough and comprehensive understanding of the present disclosure.

The following embodiments are described with reference to the accompanying drawings to exemplify particular embodiments that may be implemented by the disclosure. The serial numbers themselves, such as "first" and "second" are used herein to distinguish the objects described, and do not have any sequential or technical meaning. The terms "connection" and "coupling" in the disclosure include direct and indirect connections (couplings), unless otherwise specified. Directional terms such as "up", "down", "front", "back", "left", "right", "inside", "outside", "side", and the like referred to herein are only directions with reference to the accompanying drawings. Therefore, the directional terms used herein are intended to better and more clearly illustrate and understand the disclosure, rather than explicitly or implicitly indicate that apparatus or components referred to herein must have a certain direction or be configured or operated in a certain direction and therefore cannot be understood as limitation on the disclosure.

It is noted that, in the description of the disclosure, terms "install", "couple", "connect", and "interconnect" should be understood in a broad sense unless otherwise expressly specified and limited. For example, the terms "install", "couple", "connect", and "interconnect" may refer to fixedly connect, detachably connect, or integrally connect, may refer to mechanically connect, and may refer to a directly connect, indirectly connect through an intermediate medium, or an intercommunicate interiors of two elements. For those of ordinary skill in the art, the specific meanings of the above terms in the disclosure can be understood according to specific situations. It is noted that, the terms such as "first" and "second" in the specification, claims, and the accompanying drawings of the disclosure are used for distinguishing between different objects rather than describing a particular order.

In addition, terms such as "include", "may include", "contain", or "may contain" used herein indicate the existence of the corresponding function, operation, element, etc. disclosed, and do not limit the other one or more further functions, operations, elements, etc. In addition, the term "include" or "contain" indicates the existence of the corresponding feature, number, step, operation, element, component, or combination thereof disclosed in the specification, without excluding the existence or addition of one or more other features, numbers, steps, operations, elements, components, or combinations thereof, and is intended to cover non-exclusive inclusion. In addition, when describing the embodiments of the disclosure, the term "may" is used to denote "one or more embodiments of the disclosure". Also, the term "exemplarily" is intended to refer to examples or illustrations.

Unless otherwise defined, all technical and scientific terms used herein have the same meaning as commonly understood by those skilled in the art of the disclosure. The terms used herein in the disclosure are for describing embodiments rather than limiting the disclosure.

Reference is made to FIG. 1, which is a schematic structural view of a display apparatus provided in the disclosure. A display apparatus 100 includes a display panel 10, a power supply module 20, and a support frame 30. The display panel 10 and the power supply module 20 are fixed to the support frame 30. The power supply module 20 is disposed on the back of the display module 10, i.e., a non-display surface of the display panel 10. The power supply module 20 is configured to provide a power supply voltage to the display panel 10 for image display. The support frame 30 fixes and protects the display panel 10 and the power supply module 20.

In other embodiments of the disclosure, the display apparatus 100 may be an apparatus without the support frame 30, for example, the display apparatus 100 may be portable electronic devices such as mobile phone and tablet.

Figure 2:
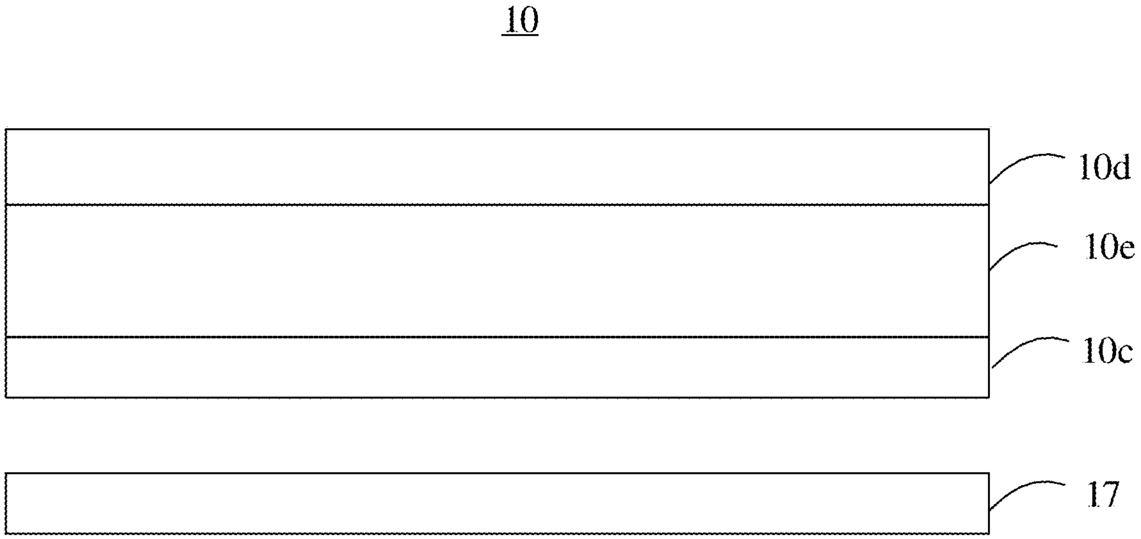
FIG. 2 is a schematic view illustrating a side structure of a display panel in FIG. 1.

Reference is made to FIG. 2, which is a schematic view illustrating a side structure of a display panel in FIG. 1.

As illustrated in FIG. 2, the display panel 10 includes an array substrate 10*c*, an opposite substrate 10*d*, and a display medium layer 10*e* sandwiched between the array substrate 10*c* and the opposite substrate 10*d*. The array substrate 10*c* and the opposite substrate 10*d* are provided with driving elements that generate corresponding electric fields according to a data signal (Data), so as to drive the display medium in the display medium layer 10*e* to emit light with corresponding brightness for image display.

Taking a liquid crystal display (LCD) panel as an example, the display panel 10 further includes a backlight module (BM) 17, which provides light to the display panel 10 for image display. The display panel 10 emits, according to image signals to-be-displayed, lights with corresponding brightness for image display.

Figure 3:
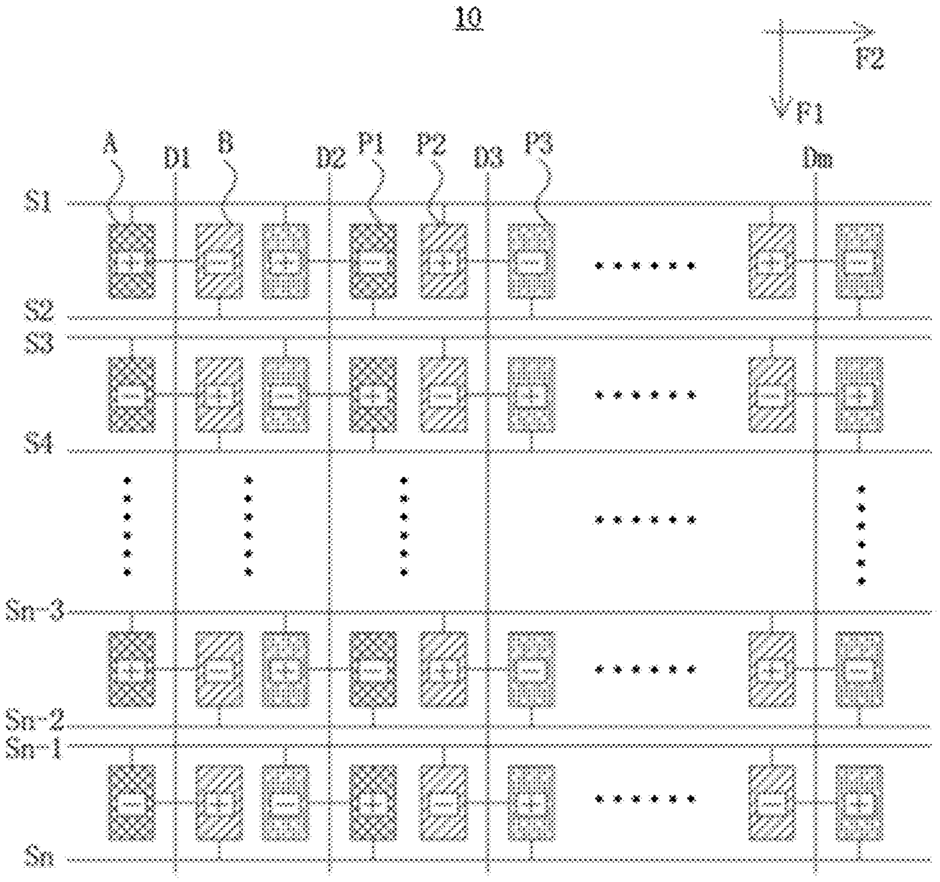
FIG. 3 is a schematic view illustrating a planar layout of the display panel in FIG. 2.

Reference is made to FIG. 3, which is a schematic view illustrating a planar layout of the display panel in FIG. 2.

As illustrated in FIG. 3, the display panel 10 further includes m data lines $D_1$~$D_m$ and n scan lines $S_1$~$S_n$ that are arranged in a grid pattern. The m data lines $D_1$~$D_m$ extend in a first direction F1, the n scan lines $S_1$~$S_n$ extend in a second direction F2, and the first direction F1 is perpendicular to the second direction F2. Sub-pixels are respectively provided at intersections between the n scan lines $S_1$~$S_n$ and the m data lines $D_1$~$D_m$. The sub-pixels receive, in a preset time period and under the control of the n scan lines $S_1$~$S_n$, a data voltage with a grayscale value in a corresponding data signal provided by the m data lines $D_1$~$D_m$, to drive the display medium in the display medium layer 10*e* to deflect by a corresponding angle and emit lights with corresponding brightness according to the deflection angle based on the backlight received, thereby emitting, according to the image signal, light with corresponding brightness for image display.

Each row of sub-pixels is connected to two scan lines, so as to receive data signals from the data line under the control of the scanning signals output from the two scan lines. Additionally, each two adjacent columns of sub-pixels are connected to the same data line to receive the data signal from the same data line, forming a dual-gate pixel architecture.

For example, multiple sub-pixels in the first row of sub-pixels are connected to a first scan line $S_1$ and a second scan line $S_2$ to receive scanning signals respectively from the first scan line $S_1$ and the second scan line $S_2$. A first column of sub-pixels and a second column of sub-pixels are connected to a first data line $D_1$ to receive the data signal from the first data line $D_1$ for image display.

Multiple sub-pixels arranged sequentially in the first direction F1 are of the same color. Multiple sub-pixels arranged in the second direction F2 include a first color sub-pixel P1, a second color sub-pixel P2, and a third color sub-pixel P3 that are arranged adjacent to one another, so as to emit lights of different colors for image display.

In an exemplary embodiment, the first color sub-pixel P1 may be a red sub-pixel, which is configured to emit red light. The second color sub-pixel P2 may be a blue sub-pixel, which is configured to emit blue light. The third color sub-pixel P3 may be a green sub-pixel, which is configured to emit green light. However, the sub-pixels can be set with other colors such as white according to actual needs, which is not limited in the disclosure.

Two sub-pixels in the same row and connected to the same data line receive the data signal from the same data line under the control of different scan lines. Multiple sub-pixels include a first sub-pixel A and a second sub-pixel B, and the first sub-pixel A and the second sub-pixel B are adjacent to each other in the same row and are connected to the same data line. For example, the first sub-pixel A and the second sub-pixel B in the same row each receive the data signal from the first data line $D_1$. Specifically, the first scan line $S_1$ output the scanning signal to control the first sub-pixel A to receive the data signal, and then the second scan line $S_2$ output the scanning signal to control the second sub-pixel B to receive the data signal.

Further, two sub-pixels in the same row and connected to the same data line receive data signals with opposite polarities. For example, the first sub-pixel A receives a data signal with a positive polarity, and the second sub-pixel B receives a data signal with a negative polarity. Alternatively, the first sub-pixel A receives a data signal with a negative polarity, and the second sub-pixel B receives a data signal with a positive polarity.

Figure 4:
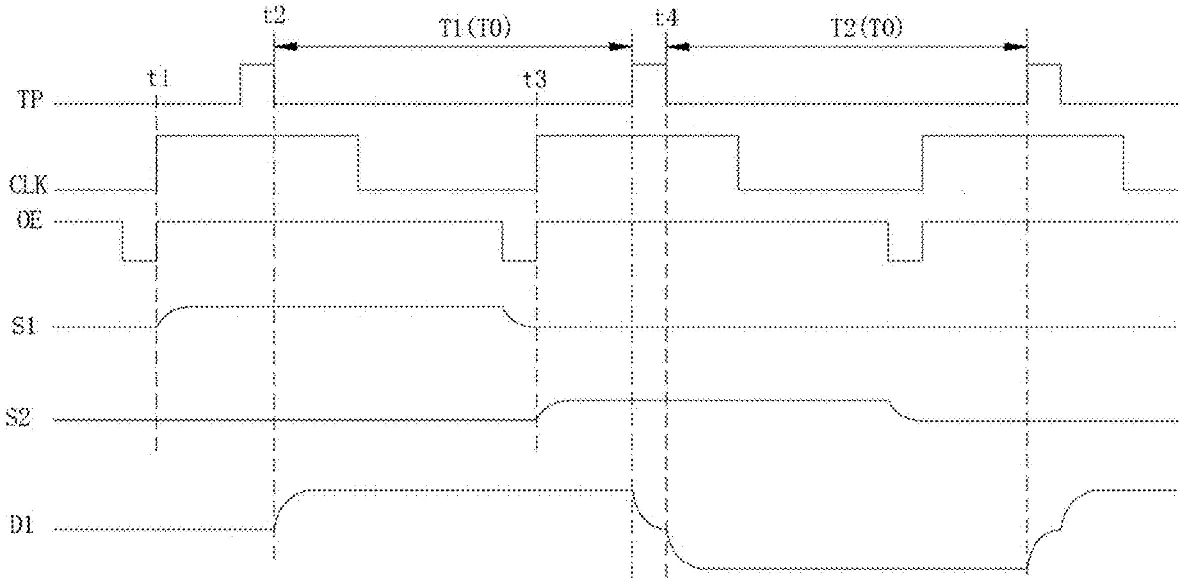
FIG. 4 is a signal output timing diagram of FIG. 3.

Reference is made to FIG. 4, which is a signal output timing diagram of FIG. 3.

As illustrated in FIG. 4, the display panel 10 is configured to use a data control signal TP, a scan control signal OE, and a clock signal CLK. The data control signal TP is used to control the output of the data signal, and the scan control signal OE and the clock signal CLK can cooperate to control the output of the scanning signal.

The first sub-pixel A and the second sub-pixel B sequentially receive the data signals from the same data line. The duration for receiving the data signal by the first sub-pixel A and the duration for receiving the data signal by the second sub-pixel B are the same, that is, the charging duration of the first sub-pixel A and the charging duration of the second sub-pixel B are the same.

Since the first sub-pixel A and the second sub-pixel B receive the data signals with opposite polarities, when the second sub-pixel B is to receive the data signal for charging, polarity of the data signal needs to be switched before being provided to the second sub-pixel B for charging. That is, the polarity of the data signal is changed from the positive polarity to the negative polarity, or changed from the negative polarity to the positive polarity, and then the data signal is provided to the second sub-pixel B for charging. In this case, the second sub-pixel B is insufficiently charged, which results in brightness not meeting expectations.

Charging of the first sub-pixel A and the second sub-pixel B involves sequential first moment t1, second moment t2, third moment t3, and fourth moment t4. At the first moment t1, i.e., a rising edge moment of the scan control signal OE, the first scan line $S_1$ begins to output the scanning signal to control the first sub-pixel A to be turned on. At the second moment t2, i.e., a falling edge moment of the data control signal TP, the first data line $D_1$ begins to output the data signal to charge the first sub-pixel A, where the charging duration is a first duration T1. At the third moment t3, the second scan line $S_2$ begins to output the scanning signal to control the second sub-pixel B to be turned on. At the fourth moment t4, the first data line $D_1$ begins to output the data signal to charge the second sub-pixel B, where the charging duration is the second duration T2. The first duration T1 and the second duration T2 are equal and both equal to the reference duration TO, that is, the charging duration of the first sub-pixel A is equal to the charging duration of the second sub-pixel B.

The second sub-pixel B receiving the data signal with opposite polarity is charged through the first data line $D_1$ after the first sub-pixel A is charged through the first data line $D_1$. In this case, due to the parasitic capacitance on the first data line $D_1$, the second sub-pixel B cannot achieve a preset brightness under driving of the previous data voltage, resulting in low display brightness of the second sub-pixel B and the appearance of vertical bright and dark lines on the screen.

Figure 5:
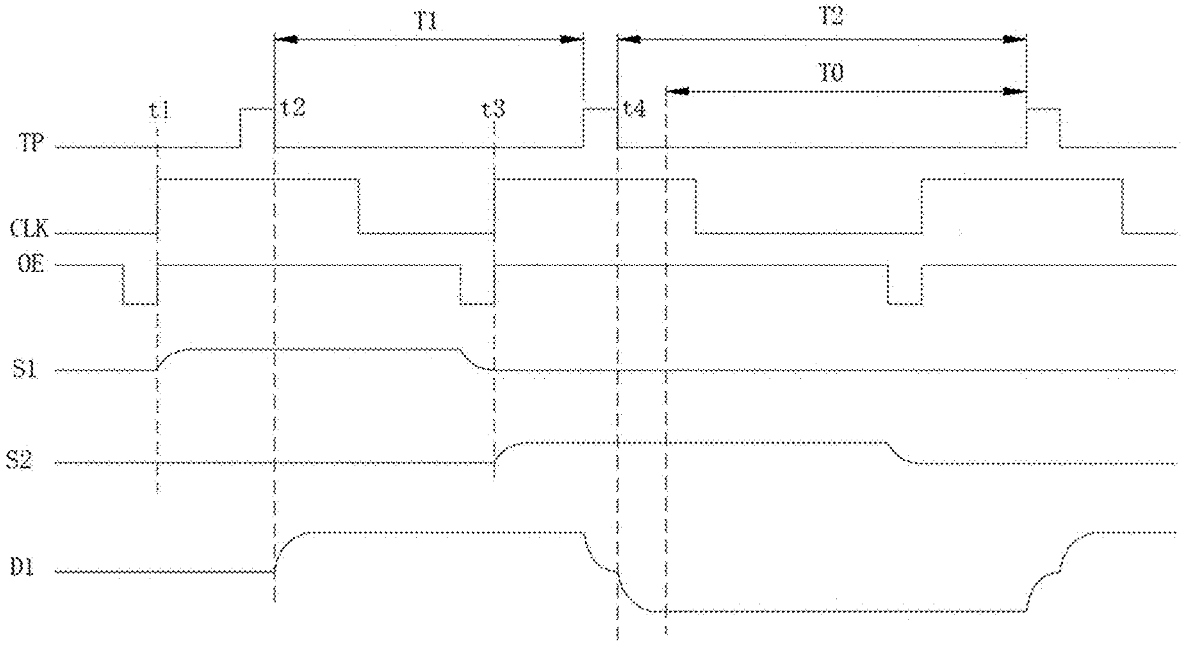
FIG. 5 is a signal output timing diagram of FIG. 3 provided in the second embodiment of the disclosure.

Reference is made to FIG. 5, which is a signal output timing diagram of FIG. 3 provided in the second embodiment of the disclosure.

As illustrated in FIG. 5, the display panel 10 is configured to use a data control signal TP, a scan control signal OE, and a clock signal CLK. The data control signal TP is used to control the output of the data signal, and the scan control signal OE and the clock signal CLK can cooperate to control the output of the scanning signal.

Two sub-pixels in the same row and connected to the same data line are the first sub-pixel A and the second sub-pixel B. When the first sub-pixel A receives the scanning signal from the first scan line $S_1$ within a scanning period, the first sub-pixel A receives a first data signal from the data line. When the second sub-pixel B receives the scanning signal from the second scan line $S_2$ within a scanning period, the second sub-pixel B receives a second data signal. The polarity of the first data signal is opposite to the polarity of the second data signal. A display grayscale of the first sub-pixel A after compensation and adjustment is less than or equal to a grayscale corresponding to the first data signal, and a difference between a display grayscale of the second sub-pixel B after compensation and adjustment and a grayscale corresponding to the second data signal falls within a preset range. The preset range can ensure a uniform brightness of the first sub-pixel A and the second sub-pixel B during image display, and thus avoiding appearance of vertical bright and dark lines on the screen.

The duration of the first sub-pixel A for receiving the data signal is the first duration T1, and the duration of the second sub-pixel B for receiving the data signal is the second duration T2. The first duration T1 is less than or equal to the second duration T2. That is, if the total charging duration of the first sub-pixel A and the second sub-pixel B remains unchanged, the charging duration of the first sub-pixel A is reduced, and the charging duration of the second sub-pixel B is extended. As such, the first sub-pixel A and the second sub-pixel B can be controlled to display in a uniform brightness, thereby eliminating the issue of low display brightness of the second sub-pixel B.

Specifically, by adjusting the starting time of the data control signal TP for the second sub-pixel B, and adjusting the starting time of the corresponding clock signal CLK and the scan control signal OE, the charging duration of the first sub-pixel A and the charging duration of the second sub-pixel B are adjusted.

For example, taking the first data line D1 as an example, the first sub-pixel A and the second sub-pixel B are connected to the first data line D1. That is, the first sub-pixel A is a sub-pixel in an odd-column of sub-pixels, and the second sub-pixel B is a sub-pixel in an even-column of sub-pixels. The first sub-pixel A is connected to the first scan line $S_1$ to receive the scanning signal from the first scan line $S_1$. The second sub-pixel B is connected to the second scan line $S_2$ to receive the scanning signal from the second scan line $S_2$.

At the first moment t1, i.e., the rising edge moment of the scan control signal OE, the first scan line $S_1$ begins to receive the scanning signal to control the first sub-pixel A to be turned on. At the second moment t2, i.e., the falling edge moment of the data control signal TP, the first data line $D_1$ begins to receive the data signal to charge the first sub-pixel A, where the charging duration is the first duration T1. At the third moment t3, the second scan line $S_2$ begins to receive the scanning signal to control the second sub-pixel B to be turned on. At the fourth moment t4, the first data line $D_1$ begins to receive the data signal to charge the second sub-pixel B, where the charging duration is the second duration T2. The first duration T1 is less than or equal to the reference duration TO, and the second duration T2 is greater than or equal to the reference duration TO. The reference duration TO is half the sum of the first duration T1 and the second duration T2, which means that the first duration T1 is less than or equal to the second duration T2. That is, the charging duration of the first sub-pixel A is less than or equal to the charging duration of the second sub-pixel B. During a time difference between the second duration T2 and the reference duration TO, the second sub-pixel B receives the second data signal to compensate a preset grayscale, such that the difference between the grayscale of the second sub-pixel B after compensation and adjustment and the grayscale corresponding to the second data signal is controlled to be within the preset range.

Figures 6, 7:
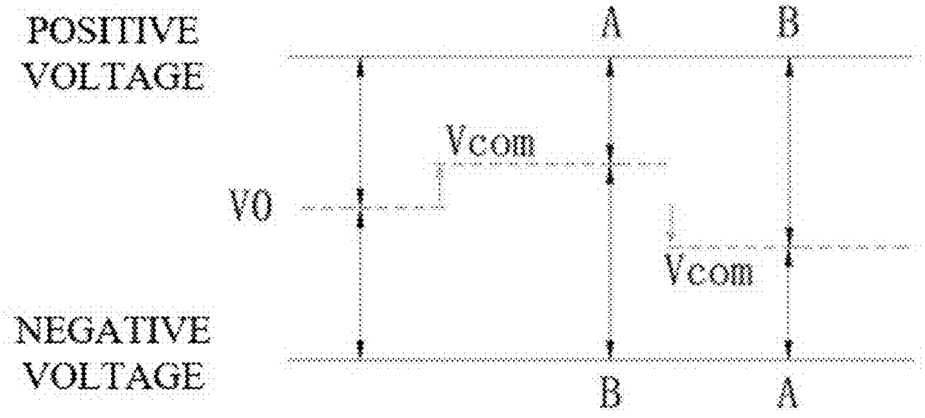
FIG. 6 is a duration adjustment lookup table for a first duration and a second duration in FIG. 5.
FIG. 7 is a schematic diagram illustrating common voltage adjustment provided in the third embodiment of the disclosure.

Reference is made to FIG. 6, which is a duration lookup table for a first duration and a second duration in FIG. 5.

As illustrated in FIG. 6, when the display grayscale of the first sub-pixel A is different from the display grayscale of the second sub-pixel B, the first duration T1 is different from the second duration T2, which means the output moment of the data control signal TP for the first sub-pixel A is different from the output moment of the data control signal TP for the second sub-pixel B. A lookup table is set in advance, where different grayscales of the first sub-pixel A and the second sub-pixel B correspond to different charging durations. The total charging duration of the first sub-pixel A and the second sub-pixel B remains unchanged, and the ratio of the charging duration of the first sub-pixel A to the charging duration of the second sub-pixel B is adjusted. That is, the ratio of the first duration T1 to the second duration T2 is adjusted.

When the display grayscale of the first sub-pixel A and the display grayscale of the second sub-pixel B are both less than or equal to a preset threshold, the first duration T1 is equal to the second duration T2, that is, a ratio of the first duration T1 to the second duration T2 is 1. When the grayscale of the first sub-pixel A and the grayscale of the second sub-pixel B are both greater than the preset threshold, the first duration T1 is less than the second duration T2, that is, a ratio of the second duration T2 to the first duration T1 is greater than 1. The ratio of the second duration T2 to the first duration T1 increases as the display grayscale of the first sub-pixel A and/or the display grayscale of the second sub-pixel B increases. That is, a higher grayscale of display by the first sub-pixel A and/or a higher grayscale of display by the second sub-pixel B corresponds to a greater ratio of the second duration T2 to the first duration T1, i.e., a longer second duration T2.

In the embodiment, the preset threshold can be grayscale 32. That is, when the display grayscale of the first sub-pixel A and the display grayscale of the second sub-pixel B are both less than or equal to grayscale 32, the charging duration of the first sub-pixel A is equal to the charging duration of the second sub-pixel B. However, according to actual needs, the preset threshold can be other values, for example grayscale 64, which will not be limited in the disclosure.

For example, when the grayscale of the data signal received by the first sub-pixel A is grayscale 32 and the grayscale of the data signal received by the second sub-pixel B is grayscale 32, the ratio of the second duration T2 to the first duration T1 is 1, which means that the charging duration of the first sub-pixel A is equal to the charging duration of the second sub-pixel B. When the grayscale of the data signal received by the first sub-pixel A is grayscale 32 and the grayscale of the data signal received by the second sub-pixel B is grayscale 96, the ratio of the second duration T2 to the first duration T1 is 1.1, which means that the second duration T2 is greater than the first duration T1. When the grayscale of the data signal received by the first sub-pixel A is grayscale 32 and the grayscale of the data signal received by the second sub-pixel B is grayscale 128, the ratio of the second duration T2 to the first duration T1 is 1.15, which means that the second duration T2 is greater than the first duration T1. When the grayscale of the data signal received by the second sub-pixel B is in the range of 96~128, the ratio of the second duration T2 to the first duration T1 is obtained by linear interpolation.

The charging duration of the first sub-pixel A and the charging duration of the second sub-pixel B are adjusted according to the grayscale of the data signal received by the first sub-pixel A and the grayscale of the data signal received by the second sub-pixel B. In this way, the first sub-pixel A and the second sub-pixel B can display in a uniform brightness, thereby effectively eliminating vertical bright and dark lines on the screen during image display.

Reference is made to FIG. 7, which is a schematic diagram illustrating common voltage adjustment provided in the third embodiment of the disclosure.

As illustrated in FIG. 7, two sub-pixels in the same row and connected to the same data line are the first sub-pixel A and the second sub-pixel B. When the first sub-pixel A receives the scanning signal from the first scan line $S_1$ within a scanning period, the first sub-pixel A receives a first data signal from the data line. When the second sub-pixel B receives the scanning signal from the second scan line $S_2$ within a scanning period, the second sub-pixel B receives a second data signal. The polarity of the first data signal is opposite to the polarity of the second data signal. A display grayscale of the first sub-pixel A after compensation and adjustment is less than or equal to a grayscale corresponding to the first data signal, and a difference between a display grayscale of the second sub-pixel B after compensation and adjustment and a grayscale corresponding to the second data signal falls within a preset range. The preset range can ensure a uniform brightness of the first sub-pixel A and the second sub-pixel B during image display, and thus the appearance of vertical bright and dark lines on the screen is avoided.

In the embodiment, the value of the common voltage $V_{com}$ is adjusted, so as to control the voltage difference between the data signal received by the first sub-pixel A and the common voltage $V_{com}$ to decrease and the voltage difference between the data signal received by the second sub-pixel B and the common voltage $V_{com}$ to increase at the same grayscale. In this way, the second sub-pixel B is compensated with the voltage difference between the common voltage $V_{com}$ and the reference voltage V0, and thus the difference between the display grayscale of the second sub-pixel B after compensation and adjustment and the grayscale corresponding to the second data signal is controlled to be within the preset range.

In the case where the data signal received by the first sub-pixel A has a positive polarity and the data signal received by the second sub-pixel B has a negative polarity, the common voltage $V_{com}$ is increased to be greater than the reference voltage V0, so as to control the voltage difference between the data signal received by the first sub-pixel A and the common voltage $V_{com}$ to decrease, and control the voltage difference between the data signal received by the second sub-pixel B and the common voltage $V_{com}$ to increase. In this way, the brightness of the first sub-pixel A is reduced and the brightness of the second sub-pixel B is increased. When the grayscale of the first data signal and the grayscale of the second data signal are the same, the difference between the first data signal and the reference voltage V0 is equal to the difference between the second data signal and the reference voltage V0, that is, the reference voltage V0 is the common voltage $V_{com}$ before adjustment.

In the case where the first data signal has a negative polarity and the second data signal has a positive polarity, the common voltage $V_{com}$ is decreased to be less than the reference voltage V0, so as to control the voltage difference between the data signal received by the first sub-pixel A and the common voltage $V_{com}$ to decrease, and control the voltage difference between the data signal received by the second sub-pixel B and the common voltage $V_{com}$ to increase. In this way, the brightness of the first sub-pixel A is reduced and the brightness of the second sub-pixel B is increased.

Reference is made to FIG. 8, which is a common voltage adjustment lookup table of FIG. 7.

As illustrated in FIG. 8, a lookup table is set with regard to the average grayscale of any row of sub-pixels. The common voltage $V_{com}$ corresponding to one row of sub-pixels is adjusted according to the average grayscale of the row of sub-pixels.

The a-th row of sub-pixels is taken as an example, where 1≤a≤n. The first sub-pixel A in the a-th row of sub-pixels receives the data signal having a positive polarity, and the second sub-pixel B in the a-th row of sub-pixels receives the data signal having a negative polarity. When an average grayscale of data signals received by all the sub-pixels is less than or equal to the preset threshold, the common voltage $V_{com}$ is equal to the reference voltage V0, that is, the common voltage $V_{com}$ will not be adjusted. When an average grayscale of data signals received by the a-th row of sub-pixels is greater than the preset threshold, the common voltage $V_{com}$ of the a-th row of sub-pixels is controlled to be greater than the reference voltage V0, that is, the common voltage $V_{com}$ of the a-th row of sub-pixels is increased.

The first sub-pixel A in the (a+1)-th row of sub-pixels receives the data signal having a negative polarity, and the second sub-pixel B in the (a+1)-th row of sub-pixels receives the data signal having a positive polarity. When an average grayscale of the data signals received by all the sub-pixels is less than or equal to the preset threshold, the common voltage $V_{com}$ is equal to the reference voltage V0, that is, the common voltage $V_{com}$ will not be adjusted. When an average grayscale of the data signals received by the (a+1)-th row of sub-pixels is greater than the preset threshold, the common voltage $V_{com}$ of the a-th row of sub-pixels is controlled to be less than the reference voltage V0, that is, the common voltage $V_{com}$ of the (a+1)-th row of sub-pixels is reduced.

For example, when a=1, for the first row of sub-pixels, the first sub-pixel A receives the data signal having a positive polarity, and the second sub-pixel B receives the data signal having a negative polarity. For the second row of sub-pixels, the first sub-pixel A receives the data signal having a negative polarity, and the second sub-pixel B receives the data signal having a positive polarity.

In the case where the preset threshold is set to be grayscale 32, during display of one frame of image, the common voltage $V_{com}$ of the first row of sub-pixels is equal to the reference voltage V0 when the average grayscale of the first row of sub-pixels is less than or equal to grayscale 32; and the common voltage $V_{com}$ of the first row of sub-pixels is controlled to increase to be greater than the reference voltage V0 when the average grayscale of the first row of sub-pixels is greater than grayscale 32.

The common voltage $V_{com}$ of the second row of sub-pixels is equal to the reference voltage V0 when the average grayscale of the second row of sub-pixels is less than or equal to grayscale 32; and the common voltage $V_{com}$ of the second row of sub-pixels is controlled to decrease to be less than the reference voltage V0 when the average grayscale of the second row of sub-pixels is greater than grayscale 32.

Furthermore, the common voltage $V_{com}$ of one row of sub-pixels is adjusted based on the average grayscale of the data signals received by the row of sub-pixels. For the a-th row of sub-pixels, the common voltage $V_{com}$ increases as the average grayscale increases. For the (a+1)-th row of sub-pixels, the common voltage $V_{com}$ decreases as the average grayscale increases.

For example, when a=1, for the first row of sub-pixels, the first sub-pixel A receives the data signal having a positive polarity, and the second sub-pixel B receives the data signal having a negative polarity. When the average grayscale of the data signals received by the first row of sub-pixels is grayscale 64, the common voltage $V_{com}$ increases by 0.3V. When the average grayscale of the data signals received by the first row of sub-pixels is grayscale 96, the common voltage $V_{com}$ increases by 0.5V. When the average grayscale of the data signals received by the first row of sub-pixels is in the range of 64~96, the adjustment for the common voltage $V_{com}$ is determined by linear interpolation.

For the second row of sub-pixels, the first sub-pixel A receives the data signal having a negative polarity, and the second sub-pixel B receives the data signal having a positive polarity. When the average grayscale of the data signals received by the second row of sub-pixels is grayscale 64, the common voltage $V_{com}$ decreases by 0.3V. When the average grayscale of the data signals received by the second row of sub-pixels is grayscale 96, the common voltage $V_{com}$ decreases by 0.5V. When the average grayscale of the data signals received by the second row of sub-pixels is in the range of 64~96, the adjustment for the common voltage $V_{com}$ is determined by linear interpolation.

By adjusting the voltage difference between the first sub-pixel A and the common voltage $V_{com}$ and the voltage difference between the second sub-pixel B and the common voltage $V_{com}$, the brightness of the first sub-pixel A is reduced, and the brightness of the second sub-pixel B is increased. In this way, the first sub-pixel A and second sub-pixel B can display in a uniform brightness and vertical bright and dark lines on the screen are eliminated.

It is to be understood that the disclosure is not limited to the above embodiments. Those of ordinary skill in the art can make improvements or changes based on the above description, and all these improvements and changes should fall within the protection scope of the appended claims of the disclosure.

What is claimed is:

1. A display panel, comprising m data lines extending in a first direction and sequentially arranged in a second direction, n scan lines extending in the second direction and sequentially arranged in the first direction, and a plurality of sub-pixels arranged in an array, wherein m and n are integers greater than or equal to 1, and the first direction is different from the second direction; wherein the plurality of sub-pixels comprise a first sub-pixel and a second sub-pixel, the first sub-pixel and the second sub-pixel are adjacent to each other in a same row and are connected to a same data line, the first sub-pixel is connected to a first scan line in two adjacent scan lines, and the second sub-pixel is connected to a second scan line in the two adjacent scan lines;

wherein during display of one frame of image, when the first sub-pixel receives a scanning signal from the first scan line within a scanning period, the first sub-pixel receives a first data signal; when the second sub-pixel receives the scanning signal from the second scan line within a scanning period, the second sub-pixel receives a second data signal, and a polarity of the first data signal is opposite to a polarity of the second data signal;

wherein a display grayscale of the first sub-pixel after adjustment is less than or equal to a grayscale corresponding to the first data signal, and a difference between a display grayscale of the second sub-pixel after adjustment and a grayscale corresponding to the second data signal falls within a preset range;

wherein in an a-th row of sub-pixels among the plurality of sub-pixels, the first data signal has a positive polarity, and the second data signal has a negative polarity, wherein when an average grayscale of the a-th row of sub-pixels is less than or equal to a preset threshold, a common voltage of the a-th row of sub-pixels is equal to a reference voltage, and wherein when the average grayscale of the a-th row of sub-pixels is greater than the preset threshold, the common voltage of the a-th row of sub-pixels is greater than the reference voltage, and the common voltage of the a-th row of sub-pixels increases as the average grayscale of the a-th row of sub-pixels increases;

wherein in an (a+1)-th row of sub-pixels among the plurality of sub-pixels, the first data signal has a negative polarity, and the second data signal has a positive polarity, wherein when an average grayscale of the (a+1)-th row of sub-pixels is less than or equal to the preset threshold, the common voltage of the (a+1)-th row of sub-pixels is equal to the reference voltage, and wherein when the average grayscale of the (a+1)-th row of sub-pixels is greater than the preset threshold, a common voltage of the (a+1)-th row of sub-pixels is less than the reference voltage, and the common voltage of the (a+1)-th row of sub-pixels decreases as the average grayscale of the (a+1)-th row of sub-pixels increases; and wherein a difference between the first data signal and the reference voltage is equal to a difference between the second data signal and the reference voltage at a same grayscale.

2. The display panel of claim 1, wherein the display panel is configured to use a data control signal, wherein the data control signal is used for a control of an output of the data signals, wherein image display performed by the first sub-pixel and the second sub-pixel involves a first moment, a second moment, a third moment, and a fourth moment that are consecutive in time; at the first moment, the first sub-pixel receives the scanning signal from the first scan line; at the second moment, the data control signal controls output of the first data signal, the first sub-pixel receives the first data signal from the data line for charging, and a charging duration is a first duration; at the third moment, the second sub-pixel receives the scanning signal from the second scan line; at the fourth moment, the data control signal controls output of the second data signal, the second sub-pixel receives the second data signal from the data line for charging, and a charging duration is a second duration; wherein the first duration is less than or equal to a reference duration, the second duration is greater than or equal to the reference duration, and the reference duration is half of a sum of the first duration and the second duration;

during a time difference between the reference duration and the first duration, the display grayscale of the first sub-pixel after adjustment is less than or equal to the grayscale corresponding to the first data signal; during a time difference between the reference duration and the second duration, the second sub-pixel receives the second data signal to compensate a preset grayscale, such that the difference between the grayscale of the second sub-pixel after adjustment and the grayscale corresponding to the second data signal is controlled to be within the preset range.

3. The display panel of claim 2, wherein a sum of the first duration and the second duration is fixed; when the grayscale of the first data signal and the grayscale of the second data signal are both less than or equal to a preset threshold, the first duration is equal to the second duration; when the grayscale of the first data signal and/or the grayscale of the second data signal is greater than the preset threshold, the first duration is less than the second duration, and a difference between the first duration and the reference duration is equal to a difference between the second duration and the reference duration.

4. The display panel of claim 3, wherein when the grayscale of the first data signal and/or the grayscale of the second data signal is greater than the preset threshold, a ratio of the second duration to the first duration increases as the grayscale of the first data signal and/or the grayscale of the second data signal increases.

5. A display apparatus, comprising a power supply module and a display panel, wherein the power supply module is configured to provide a power supply voltage for image display of the display panel, wherein the display panel comprises m data lines extending in a first direction and sequentially arranged in a second direction, n scan lines extending in the second direction and sequentially arranged in the first direction, and a plurality of sub-pixels arranged in an array, wherein m and n are integers greater than or equal to 1, and the first direction is different from the second direction; wherein the plurality of sub-pixels comprise a first sub-pixel and a second sub-pixel, the first sub-pixel and the second sub-pixel are adjacent to each other in a same row and are connected to a same data line, the first sub-pixel is connected to a first scan line in two adjacent scan lines, and the second sub-pixel is connected to a second scan line in the two adjacent scan lines;

wherein during display of one frame of image, when the first sub-pixel receives a scanning signal from the first scan line within a scanning period, the first sub-pixel receives a first data signal; when the second sub-pixel receives the scanning signal from the second scan line within a scanning period, the second sub-pixel receives a second data signal, and a polarity of the first data signal is opposite to a polarity of the second data signal;

wherein a display grayscale of the first sub-pixel after adjustment is less than or equal to a grayscale corresponding to the first data signal, and a difference between a display grayscale of the second sub-pixel after adjustment and a grayscale corresponding to the second data signal falls within a preset range;

wherein in an a-th row of sub-pixels among the plurality of sub-pixels, the first data signal has a positive polarity, and the second data signal has a negative polarity, wherein when an average grayscale of the a-th row of sub-pixels is less than or equal to a preset threshold, a common voltage of the a-th row of sub-pixels is equal to a reference voltage, and wherein when the average grayscale of the a-th row of sub-pixels is greater than the preset threshold, the common voltage of the a-th row of sub-pixels is greater than the reference voltage, and the common voltage of the a-th row of sub-pixels increases as the average grayscale of the a-th row of sub-pixels increases;

wherein in an (a+1)-th row of sub-pixels among the plurality of sub-pixels, the first data signal has a negative polarity, and the second data signal has a positive polarity, wherein when an average grayscale of the (a+1)-th row of sub-pixels is less than or equal to the preset threshold, the common voltage of the (a+1)-th row of sub-pixels is equal to the reference voltage, and wherein when the average grayscale of the (a+1)-th row of sub-pixels is greater than the preset threshold, a common voltage of the (a+1)-th row of sub-pixels is less than the reference voltage, and the common voltage of the (a+1)-th row of sub-pixels decreases as the average grayscale of the (a+1)-th row of sub-pixels increases; and wherein a difference between the first data signal and the reference voltage is equal to a difference between the second data signal and the reference voltage at a same grayscale.

6. The display apparatus of claim 5, wherein the display panel is configured to use a data control signal, wherein the data control signal is used for a control of an output of the data signals, wherein image display performed by the first sub-pixel and the second sub-pixel involves a first moment, a second moment, a third moment, and a fourth moment that are consecutive in time; at the first moment, the first sub-pixel receives the scanning signal from the first scan line; at the second moment, the data control signal controls output of the first data signal, the first sub-pixel receives the first data signal from the data line for charging, and a charging duration is a first duration; at the third moment, the second sub-pixel receives the scanning signal from the second scan line; at the fourth moment, the data control signal controls output of the second data signal, the second sub-pixel receives the second data signal from the data line for charging, and a charging duration is a second duration; wherein the first duration is less than or equal to a reference duration, the second duration is greater than or equal to the reference duration, and the reference duration is half of a sum of the first duration and the second duration;

during a time difference between the reference duration and the first duration, the display grayscale of the first sub-pixel after adjustment is less than or equal to the grayscale corresponding to the first data signal; during a time difference between the reference duration and the second duration, the second sub-pixel receives the second data signal to compensate a preset grayscale, such that the difference between the grayscale of the second sub-pixel after adjustment and the grayscale corresponding to the second data signal is controlled to be within the preset range.

7. The display apparatus of claim 6, wherein a sum of the first duration and the second duration is fixed; when the grayscale of the first data signal and the grayscale of the second data signal are both less than or equal to a preset threshold, the first duration is equal to the second duration; when the grayscale of the first data signal and/or the grayscale of the second data signal is greater than the preset threshold, the first duration is less than the second duration, and a difference between the first duration and the reference duration is equal to a difference between the second duration and the reference duration.

8. The display apparatus of claim 7, wherein when the grayscale of the first data signal and/or the grayscale of the second data signal is greater than the preset threshold, a ratio of the second duration to the first duration increases as the grayscale of the first data signal and/or the grayscale of the second data signal increases.

* * * * *